US011222496B2

(12) United States Patent
Goldstein

(10) Patent No.: US 11,222,496 B2
(45) Date of Patent: Jan. 11, 2022

(54) DEVICE AND METHOD FOR AUTHENTICATION

(71) Applicant: VerifyMe, Inc., Rochester, NY (US)

(72) Inventor: Keith Goldstein, Rochester, NY (US)

(73) Assignee: VerifyMe, Inc., Rochester, NY (US)

( * ) Notice: Subject to any disclaimer, the term of this patent is extended or adjusted under 35 U.S.C. 154(b) by 0 days.

(21) Appl. No.: 17/026,875

(22) Filed: Sep. 21, 2020

(65) Prior Publication Data

US 2021/0005043 A1 Jan. 7, 2021

Related U.S. Application Data

(63) Continuation of application No. 16/363,712, filed on Mar. 25, 2019, now Pat. No. 10,783,734.

(60) Provisional application No. 62/648,246, filed on Mar. 26, 2018.

(51) Int. Cl.
| | |
|---|---|
| *G07D 7/1205* | (2016.01) |
| *G06K 19/077* | (2006.01) |
| *G06K 7/12* | (2006.01) |
| *B41M 3/14* | (2006.01) |
| *G07D 7/128* | (2016.01) |

(52) U.S. Cl.
CPC .......... *G07D 7/1205* (2017.05); *B41M 3/144* (2013.01); *G06K 7/12* (2013.01); *G06K 19/07749* (2013.01); *G07D 7/128* (2013.01)

(58) Field of Classification Search
CPC ..... G07D 7/1205; G07D 7/128; B41M 3/144; G06K 7/12; G06K 19/07749
USPC ......................................................... 356/71
See application file for complete search history.

(56) References Cited

U.S. PATENT DOCUMENTS

| | | | |
|---|---|---|---|
| 5,093,147 A | 3/1992 | Andrus et al. | |
| 5,212,558 A | 5/1993 | Obata et al. | |
| 5,289,547 A | 2/1994 | Ligas et al. | |
| 5,575,790 A | 11/1996 | Chen et al. | |
| 5,673,338 A * | 9/1997 | Denenberg | G06K 9/3233 |
| | | | 382/209 |
| 5,939,468 A | 8/1999 | Siddiqui | |
| 5,974,150 A | 10/1999 | Kaish et al. | |
| 6,483,576 B1 | 11/2002 | Gardner | |
| 6,672,718 B1 | 1/2004 | Stovid | |
| 6,813,011 B2 | 11/2004 | Gardner et al. | |
| 7,046,828 B1 * | 5/2006 | Gibbs | G06Q 30/00 |
| | | | 382/119 |
| 7,841,513 B1 * | 11/2010 | Katzer | G06Q 10/00 |
| | | | 235/375 |
| 7,939,239 B2 | 5/2011 | Gardner et al. | |
| 8,841,063 B2 | 9/2014 | Gardner et al. | |

(Continued)

*Primary Examiner* — Roy M Punnoose
(74) *Attorney, Agent, or Firm* — McHale & Slavin, P.A.

(57) ABSTRACT

Disclosed is a device and process for marking and detecting labels with spectral band authentication features utilizing a reader that can be affixed to a smart phone and positioned so as to align the lens of the phone's camera with a reader aperture. The reader aperture allows the camera to view an item through a spacer, wherein a UV and IR light source is used to reveal indicia within invisible ink. The light source employs a distinct emission spectrum characterized by narrow peaks and gaps which can illuminate pigment of the invisible ink that is selectively responsive at the wavelengths of specific peaks and/or unresponsive at the gaps in the spectrum. The smart phone captures the indicia revealed and interfaces with a cloud-based database to provide verification of authenticity.

20 Claims, 8 Drawing Sheets
(5 of 8 Drawing Sheet(s) Filed in Color)

(56) References Cited

U.S. PATENT DOCUMENTS

| | | | |
|---|---|---|---|
| 9,123,190 B2* | 9/2015 | Pawlik | G07D 7/12 |
| 9,159,016 B2 | 10/2015 | Gardner et al. | |
| 9,183,688 B2 | 11/2015 | Gardner et al. | |
| 2002/0012445 A1* | 1/2002 | Perry | G06T 1/0042 |
| | | | 382/100 |
| 2004/0188528 A1* | 9/2004 | Alasia | G07D 7/004 |
| | | | 235/468 |
| 2006/0091209 A1* | 5/2006 | He | G06K 7/10851 |
| | | | 235/385 |
| 2006/0091221 A1* | 5/2006 | He | G06K 7/10851 |
| | | | 235/470 |
| 2010/0328420 A1* | 12/2010 | Roman | G02B 13/001 |
| | | | 348/14.08 |
| 2011/0293185 A1* | 12/2011 | Silverbrook | G06T 7/70 |
| | | | 382/182 |
| 2011/0294543 A1* | 12/2011 | Lapstun | H04N 1/00129 |
| | | | 455/556.1 |
| 2012/0092131 A1* | 4/2012 | Vasic | G02B 6/0045 |
| | | | 340/10.1 |
| 2014/0210998 A1* | 7/2014 | Pawlik | G07D 7/12 |
| | | | 348/135 |
| 2015/0028578 A1* | 1/2015 | Pawlik | B42D 25/30 |
| | | | 283/67 |
| 2015/0126245 A1* | 5/2015 | Barkan | G06K 7/10881 |
| | | | 455/556.1 |
| 2015/0317503 A1* | 11/2015 | Powell | G06K 7/0004 |
| | | | 235/455 |
| 2015/0341533 A1* | 11/2015 | Yoshida | G02B 7/02 |
| | | | 348/207.1 |
| 2015/0356336 A1* | 12/2015 | Hoobler | G06K 7/089 |
| | | | 235/455 |
| 2016/0078706 A1* | 3/2016 | Pawlik | G07D 7/1205 |
| | | | 348/135 |
| 2016/0232389 A1* | 8/2016 | Gifford | G06K 7/10386 |
| 2016/0292477 A1* | 10/2016 | Bidwell | G06K 7/10831 |
| 2017/0091502 A1* | 3/2017 | Furlong | G06K 7/10831 |
| 2019/0194484 A1* | 6/2019 | Villwock | C09D 11/328 |
| 2019/0234799 A1* | 8/2019 | Dorier | G01J 3/1838 |
| 2019/0236886 A1* | 8/2019 | Dorier | G07D 7/1205 |
| 2020/0405148 A1* | 12/2020 | Tran | A61B 3/14 |

* cited by examiner

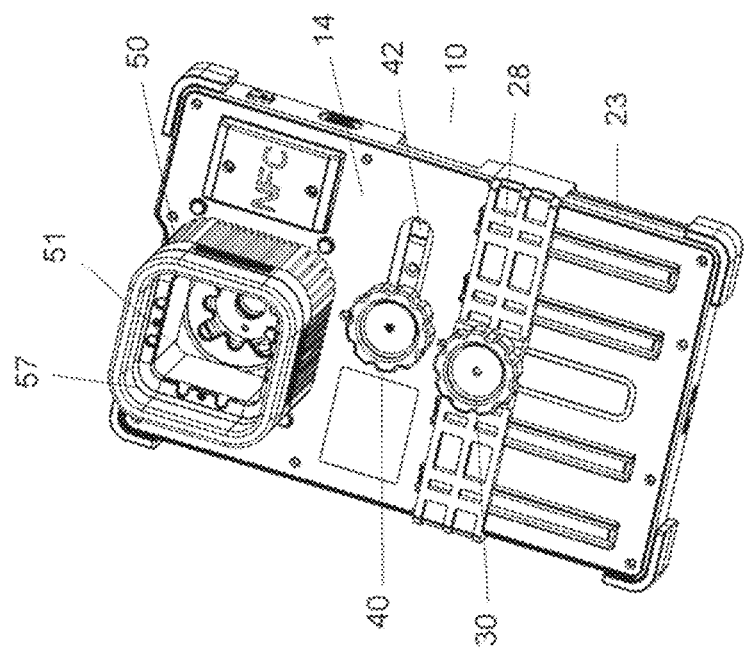
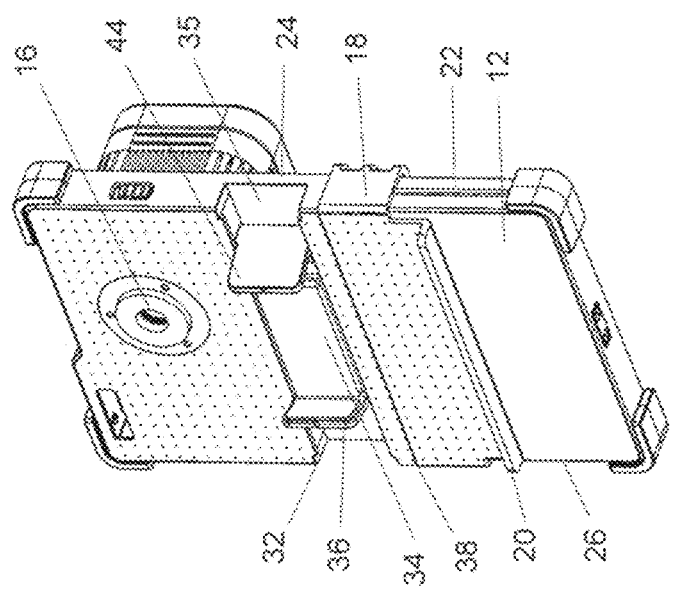

DEVICE AND METHOD FOR AUTHENTICATION

PRIORITY CLAIM

In accordance with 37 C.F.R. § 1.76 a claim of priority is included in an Application Data Sheet filed concurrently herewith. Accordingly, the present invention claims priority to U.S. Provisional Patent Application No. 62/648,246, entitled "DEVICE AND METHOD FOR AUTHENTICATION", filed Mar. 26, 2018. The contents of the above referenced application are incorporated herein by reference.

FIELD OF THE INVENTION

The invention relates generally to the field of document authentication and, in particular, to a device for the selective use of light sources having light emission and absorption characteristics in certain corresponding spectral bands that can verify the authenticity of a document.

BACKGROUND OF THE INVENTION

Authenticity of documents can be performed by many techniques. For instance, a document may include hidden indicia that can be detected by various means such as optical lenses, light illumination, or coding. The issues of authentication and counterfeit deterrence are critical to the livelihood of manufacturers, and for the protection of consumers. Improved verification and counterfeiting prevention mechanisms are extremely important in labeling, verifying the contents of packaged goods, verifying the source of goods, and so forth. Counterfeit products are, by definition, unauthorized copies of a product, its packaging, labeling, and/or its logo(s). Counterfeiting and product diversion are estimated to have a 1.8 trillion dollar adverse impact on all verticals, as it is difficult to verify originals versus the non-originals.

Attractive targets for counterfeiters are items with significant brand equity. In the commercial manufacturing world, it is not uncommon for counterfeit or otherwise unauthorized goods to be manufactured, distributed, and sold in direct competition with authentic goods. Counterfeit articles can so closely resemble genuine goods that consumers readily confuse the counterfeit articles with the authentic articles. In other circumstances, the manufacturer segments the world market for different sales and distribution practices, so that the "counterfeit" goods may be essentially identical to authorized goods. Further, in many instances, a manufacturer produces goods under license from an intellectual property owner, and thus sales outside the terms of the license agreement are also "counterfeit."

A wide variety of attempts have been made to limit the likelihood of counterfeiting. For example, some have tried to assure the authenticity of items by putting encoded or unencoded markings thereon (e.g., an artist's signature on his or her painting). Unfortunately, as soon as the code is broken and/or the markings can be replicated, this method becomes worthless for authentication purposes.

U.S. Pat. No. 5,574,790 discloses a multiple-reader system for authentication of articles based on multiple sensed fluorescent discriminating variables, such as wavelengths, amplitudes, and time delays relative to a modulated illuminating light. The fluorescent indicia incorporate spatial distributions, such as bar codes as discriminating features, to define a user-determined and programmable encryption of the articles' authentic identity.

U.S. Pat. No. 5,289,547 discloses a method for authenticating articles including incorporating into a carrier composition a mixture of at least two photochromic compounds that have different absorption maxima in the activated state and other different properties to form the authenticating display data on the article, subjecting the display data to various steps of the authenticating method, activating all photochromic compounds, preferential bleaching of less than all of the photochromic compounds, and/or bleaching of all the photochromic compounds, and subsequent examination of the display data following the various activation and bleaching steps by verifying means to enable authentication.

U.S. Pat. No. 5,974,150 discloses an anti-counterfeiting system wherein an authentication certificate affixed to a product is impregnated with dichroic fibers containing a fluorescent dye. In order to determine if the imprinted code corresponds to the certificate itself, the fiber pattern, which is completely random, is illuminated by a light and read by a scanner. The resulting pattern is then compared to the encoded pattern to determine authenticity.

U.S. Pat. No. 5,212,558 discloses an encoding system wherein a confidential image is recorded on a substrate using invisible ink. The invisible ink emits visible light having a wavelength of about 360-380 nm when irradiated with light having a wavelength of 250 nm.

U.S. Pat. No. 5,939,468 discloses jet ink compositions suitable for producing marks on objects that are invisible to the unaided eye and are visible only when excited by exciting radiation in the preferred wavelength region of from about 275 nm to about 400 nm.

U.S. Pat. No. 5,093,147 discloses a method for providing intelligible marks that are virtually invisible to the unaided eye on the surface of an article. The invention is based on a jet ink containing an organic laser dye that is poorly absorptive in the visible range of about 400 to 700 nm, is absorptive of radiation in the near infrared range of at least 750 nm, and fluoresces in response to radiation excitation in the infrared range at a wavelength longer than that of the exciting radiation. Thus, the marks remain invisible to the naked eye after excitation.

Prior art patents by the Applicant related to document authentication include U.S. Pat. Nos. 6,483,576; 6,672,718; 6,813,011; 7,939,239; 8,841,063; 9,183,688 and 9,159,016, all of which are incorporated herein by reference.

What is lacking in the art is a simple to use device that can be used to authenticate products by evaluating hidden indicia on product labels using matching and mismatching illumination sources for absorption in certain bands, spectrally matched (or mismatched) pigments to assume a distinctly different appearance based upon the illumination source used, and interfacing with a cloud based server for instant verification of authentication.

SUMMARY OF THE INVENTION

Disclosed is a device and method for using a dual verification system to authenticate a document. A visible code can be assigned with an invisible code for use in document or product authenticity. In an exemplary embodiment, a label is printed with a visible and invisible printed image or randomly generated code which can be alpha, numeric, symbol or image that is only visible under a specific wavelength of light. A reader coupled to a smart phone is used to decode the invisible printed code by illuminating the invisible mark with a proper spectrum light, and the code is then authenticated against a database.

An objective of the invention is to provide a device and method to authenticate a document based on checking an invisible code or mark placed on the document against a database to confirm authenticity.

Another objective of the invention is to disclose a smart phone coupled to a device for use in confirming the authenticity of a document containing an invisible code or mark.

Yet still another objective of the invention is to disclose a reader body having smart phone characteristics for use in confirming the authenticity of a document containing an invisible code or mark.

Still another objective of the invention is to provide a process for confirming the authenticity of an item, wherein a device affixed to a smart phone reveals a hidden code or mark that is read by the camera on the phone and displayed on the phone's screen; wherein a user can visually compare the mark to a database or use a smart phone and take a picture of the mark to upload to a cloud-based system to confirm the authenticity of the mark.

Still another objective of the invention is to provide a device having an emission spectrum light source for illuminating invisible indicia, wherein the spectrum contains concentrated light energy in a narrow band in the visible spectrum. The pigmentation of invisible code is selected such that the material used to implant the code is strongly absorptive at that limited wavelength band. In this way, the code has a distinctly different color appearance under the respective illumination spectra of the two sources.

Another objective of the invention is provide a reader that can be used with multiple sizes of smart phone, or utilized with a designated smart phone. A Bluetooth or any other type of interface recognizes a smart phone previously employed to allow for quick substitution.

Yet still another objective of the invention is to provide two light sources used for comparison, wherein one light source has a broad and continuous spectrum, and the other light source is used to test for the presence of pigment used to write the code, having a strong and exclusive narrow peak emission band, preferably functioning as a primary color component of a summed wavelength set for simulating daylight or human visible light, and which corresponds very closely to the peak in the absorption spectrum of the pigmented code.

Another objective of the invention is to mask a normally visible code in a background of a similar hue, wherein the invention is used to cause the background or foreground to change hue so as to develop a contrast, revealing the particular code. In these and other similar situations, the existence or content of the code is concealed until a particular illumination source is applied.

Still another objective of the invention is to disclose a reading device (light source) that allows a user to check the authentication of a document by reading a hidden number to determine if the hidden number matches a text, email, or phone call information they received from a database.

Another objective of the invention is to uniquely identify products and packaging with visible and invisible indicia providing brand inspectors with a mobile device and process for authenticating products.

Still another objection of the invention is to leverage a single ink for multiple purposes; and leverage the power and capability of digital print technologies to implement the use of invisible ink.

A benefit of the invention is that, if the reading device reveals that the hidden image on a document matches a text, email, or phone call number, then the document is authentic. If the hidden mark is different or hidden, the document is a fake.

Other objectives and further advantages and benefits associated with this invention will be apparent to those skilled in the art from the description, examples and claims which follow.

BRIEF DESCRIPTION OF THE FIGURES

The patent or application contains at least one drawing executed in color. Copies of this patent or patent application publication with color drawings will be provided by the Office upon request and payment of the necessary fee.

FIG. 1 is a front perspective view of the reading device of the instant invention;

FIG. 4 is a rear perspective view thereof;

DETAILED DESCRIPTION OF THE PREFERRED EMBODIMENT

Figure 2:
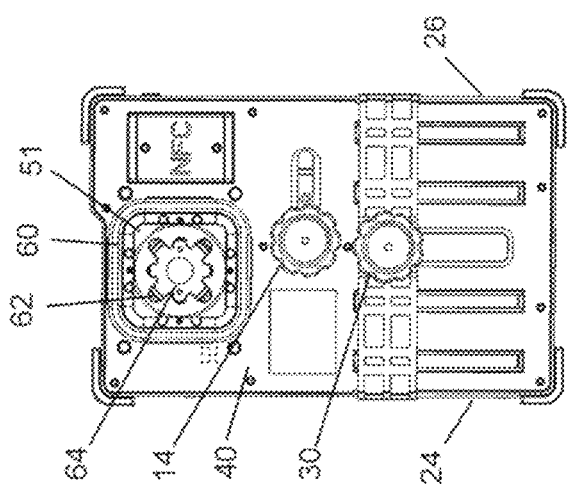
FIG. 2 is a front plane view thereof.
Figure 3:
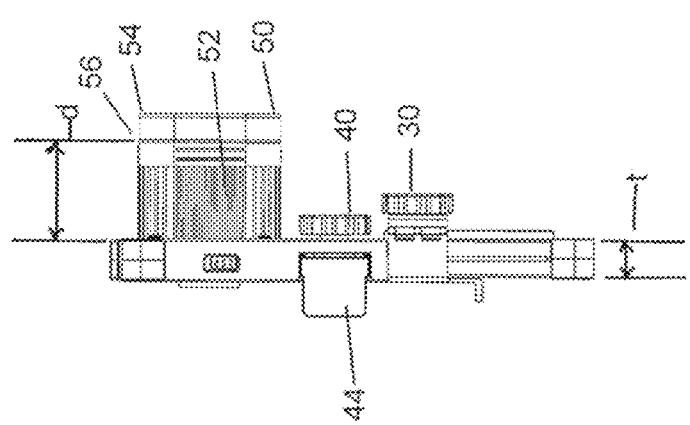
FIG. 3 is a right side plane view thereof.
Figure 7:
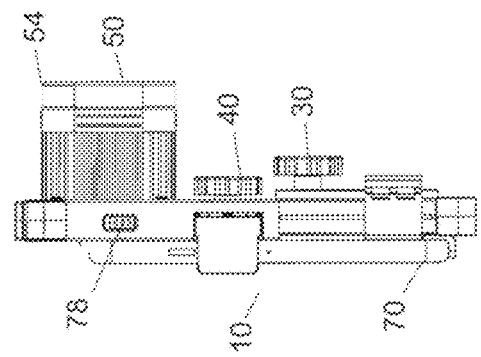
FIG. 7 is a side plane view of the reading device with a smart phone affixed thereto.
Figure 6:
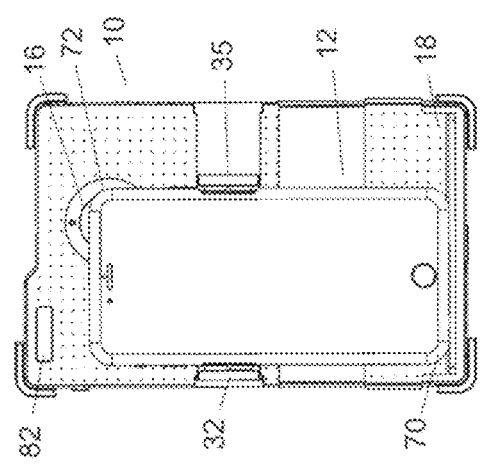
FIG. 6 is a rear plane view of the reading device with a smart phone affixed thereto.
Figure 5:
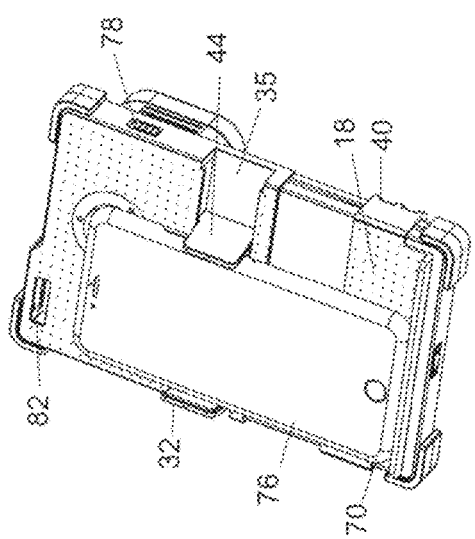
FIG. 5 is a rear perspective view of the reading device with a smart phone affixed thereto.
Figure 8:
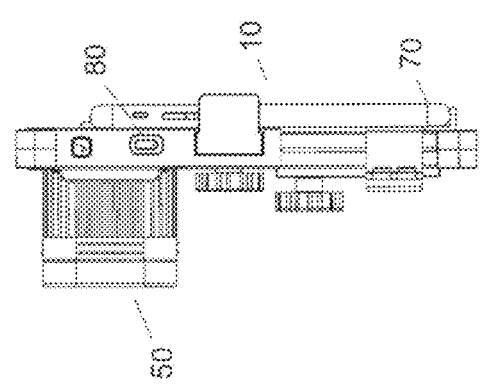
FIG. 8 is a bottom plane view of the reading device with a smart phone affixed thereto.

A detailed embodiment of the instant invention is disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Disclosed in Assignee's U.S. Pat. No. 8,551,683, incorporated herein by reference, is a combination light source and subject. The light source has an illumination spectrum characterized by a distinctively stronger narrow band emission peak that has a predetermined wavelength within a spectrum compared to other wavelengths; and, the document has a pigment applied thereto, wherein the pigment has a reflection spectrum characterized by one of a distinctively stronger reflection peak at the predetermined wavelength compared to said other wavelengths, and a distinctively weaker reflection gap at the predetermined wavelength compared to said other wavelengths. The pigment gives the document or product or the like a distinct appearance when illuminated by the light source due to a color shift from the emission peak matching one of the reflection peak and the reflection gap, as compared to a nominal appearance when illuminated by an alternate light source which does not include the distinctively stronger emission peak at the predetermined wavelength as compared to said other wavelengths. In the preferred embodiment, the ink is marketed under the name RainbowSecure® for use with HP Indigo™ presses. The ink, which operates most covertly at 950 nm or 980 nm, allows variable printing on HP Indigo™ presses to produce images that cannot be detected by the human eye and, when used in combination with an overt QR and/or 2D barcode, provides a dual layer of protection. The RainbowSecure® ink is placed within an HP Indigo™ cartridge, and other digital printing processes, within one of the seven ink stations within the HP Indigo™ for application of the hidden indicia during the normal printing process. The hidden indicia could be dot patterns, characters, numbers, bar codes, digital water marks, and the like. The hidden indicia may be predetermined or randomly generated.

Applicant has adapted this technology in a device and process for marking and detecting labels with spectral band authentication features utilizing a smart phone reader 10 for receipt of a smart phone 70. The images cannot be copied or scanned. As illustrated in FIGS. 1-4, the reader 10 has a front surface 12 and a rear surface 14. The front surface 12 having an aperture 16 which is centrally placed to provide a universal alignment to all known commercially available smart phones. A smart phone, used herein, is a mobile telephone capable of performing many microprocessor based computer functions including touch screen interface, and internet access, and includes an operating system capable of running downloaded applications. The smart phone will be equipped with image processing software. The front surface 12 includes an adjustable height bracket 18 having a base 20 for supporting a bottom edge of a smart phone. The adjustable height bracket 18 is slidable along tracks 22, 23 formed on each side edge 24, 26 of the reader 10. The tracks 22, 23 and rear bracket 28 maintain the base 20 in a perpendicular position to each side edge 24, 26 when the adjustable height bracket 18 is slid along the tracks 22, 23. The adjustable height bracket 18 can be moved into a position so that the lens of a smart phone camera is aligned with the aperture 16. A height adjustment screw 30 provides a frictional interface between the screw and the rear surface 14 of the reader 10, to maintain the adjustable height bracket 18 in a fixed position.

The front surface 12 further includes an adjustable width bracket 32 having a side wall 34 for supporting a first side edge of a smart phone. The adjustable width bracket 32 is slidable along a guideway 35 having side surfaces 36 and 38. The adjustable width bracket 32 is movable by use of width adjustment screw 40 that can move along slot 42 formed on the rear surface 14. Additionally, a base bracket 44 frictionally engages the guideway 35, providing a moveable bracket to capture a second side edge of a smart phone.

A lens spacer 50 extends from the rear surface 14 a distance "d". The lens spacer 50 is preferably constructed of aluminum, having a series of slits 52 formed thereon to operate as a passive heat sink to regulate temperatures of the lens spacer 50 during prolonged LED light operation. A shroud 54, preferably constructed of flexible rubber, is attached to a distal end 56 of the lens spacer 50. The shroud 54 provides a shield to reduce ambient light from affecting light produced by the lights located within the lens spacer 50. In the preferred embodiment, the shroud 54 provides sufficient flexibility to conform to the curvature of a bottle.

The lens spacer 50 houses a light source 51 comprising a plurality of infrared (IR) lights, ultraviolet (UV) lights and visible lights use LED's. When the reader is affixed to a smart phone, the brackets 18, 32 are moved so as to position the camera lens of the smart phone over the aperture 16. The lens spacer 50 provides a predetermined distance "d", taking the thickness "t" of the reader 10 into consideration, where the smart phone camera will be properly positioned to view an image through the lens spacer. The lens spacer 50 can include either an aperture or a secondary lens to allow the smart phone camera to view an image. With proper spacing, the lens spacer 50 may only need a cover lens to protect the internal light source. In operation, the smart phone screen will display an image covered by the lens spacer on the smart phone display screen. The spacer is not needed for UV or visible light.

Referring to FIGS. 5-8, illustrated is the reader 10 having a front surface 12 with a smart phone 70 secured thereto. In this example, the smart phone 70 has a camera positioned along a corner edge 72 which is positioned over the aperture 16. The smart phone has a touch screen display 76 that is uninhibited by adjustable height bracket 18 or the adjustable width bracket 32. In this example, the base bracket 44 is moved along the guideway 35 so as to position the smart phone and adjustable width bracket 34 used to capture the smart phone 70 therebetween. The light source is powered by a rechargeable battery enclosed within said reader 10, replaceable batteries, or direct power. An on-off power switch 78 couples the light source 51 to the internal battery. A selector switch 80 can override the app and be used to toggle between the various LED's that provide the light source and operational aspects of the LED selected; battery condition and blue tooth interface can be viewed on display screen 82.

The light source 51 has narrow spectral band peaks, exemplified by certain types of IR 60 or UV 62 lighting. In such a light source, a combination of narrow wavelength bands (typically three primary color wavelengths) when added normally simulate illumination from a broadband source such as sunlight, having a given color temperature. The light source 51 is applied to a wavelength absorptive pigment that is matched to at least one narrow band in the light source, by virtue of a band, at which the pigment is strongly absorptive. The preferably narrow absorptive band of the pigment is at least partly complementary to one of the color peaks emitted from the light source.

An exemplary narrow band light source for use in accordance with the invention may have discrete spectral peaks at particular wavelengths at visible blue, green and red wavelength bands. When these spectral peaks are added at appropriate relative amplitudes, the illumination is perceived by the eye as substantially white broadband light. A blue peak at 440 nm+−0.15 nm, a green peak at 544 nm+−0.15 nm, and a red peak at 611 nm+−0.15 nm are provided. Preferably, the bands are added at energy levels that cause the sum of the three sources to appear as a nominal color, for example the white of sunlight.

A particular pigment having a nominal color when illuminated with a true broadband source is specifically matched to the narrow band illumination source as described. Preferably, the pigment has an absorptive peak (i.e., a reflective spectral gap) that is sufficiently strong and sufficiently matched to the wavelength band of one of the illumination source peaks that the overall color or hue, from the summed proportions of reflected colors from the pigment, shifts substantially and noticeably based on whether the particular narrow band keying peak wavelength is present in the illumination source.

In the preferred embodiment, there are four IR lights generating a wavelength between 700 nm to 1100 nm, and four UV lights generating a wavelength between 200 nm to 400 nm. With the light source shining, the pigment allows the reader to view the hidden mark, and can display the mark on the screen of the smart phone. The IR and UV light can be used independently, or combined. For instance, data may be encoded on a document or label which can be read only by IR or UV. Data may also be encoded on a document or label which can be read only by IR and UV. Further, pigments can be overlapped or juxtapositioned wherein the IR and UV light deciphers both hidden images simultaneously. In one embodiment, the user can then take a picture of the hidden mark, which could be a bar code or serial number, or any other distinguishing mark, which can also be called data. The picture can then be uploaded to an online or cloud-based system to confirm the authenticity of the item.

Because the pigment can be obscured when ambient light is present, the lens spacer 50 can include the shroud 54 to cover over the area of the item containing the mark. The shroud can also prevent others from seeing the hidden mark, so that the only display is on the screen of the phone, viewed through the reader. The lens spacer has a transparent cover 57 over the distal end 56. In a preferred embodiment, the transparent cover 57 may be adjoined by a filter lens such as an anti-reflective coating, or the transparent cover and filter characteristics combined, allowing the smart phone camera to receive a brighter and crisper image.

In one embodiment of the invention, an app is installed on the phone to aid in security. With the app installed, the smart phone can electronically connect to the reader through a wired connection or a wireless connection, such as Near Field Communication (NFC), Bluetooth, or other standard wireless connection. A NFC/RFID reader can be included, wherein a visible barcode could be replaced with an NFC (RFID) tag commonly used as part of a serialization/track and trace solution. In this regard, the reader may obtain an embedded serial number and forward the data string to the cloud based authentication database. The authentication step may again indicate the location of hidden indicia, and the light source would be used for revealing the pigment for capture by the smart phone.

With a prepared app installed, the smart phone can take a picture of the hidden mark without displaying the image on the phone, or by displaying it in a way to help obscure the image from anyone else nearby. The picture of the mark can then be uploaded through the app to a cloud-based database to confirm the authenticity of the item. The app accesses the smart phone image processing software which can allow for image enhancement and convert serial numbers to alpha numerics. The app first provides a list of products to scan a visible or invisible QR code (bar code), serial number, or any type of code. In one embodiment, a smart phone is coupled to a reader 10; the reader 10 having IR lights, UV lights, and visible lighting. A shroud around the filter lens provides a predetermined distance between the smart phone and the image to be scanned. The shroud is preferably constructed of aluminum with heat dissipating surface cuts. An end of the shield includes a flexible edge covering that ideally conforms to the surface of the label to be scanned. For instance, the flexible edge covering might be used to conform to the curvature of a bottle, blocking the ambient light from reaching the label area to be scanned. The lighting from the reader 10 is enhanced when the ambient light is reduced or eliminated. In addition, the lens, formed convex to enlarge the image without refocusing the smart phone, includes a reflective coating, allowing more controlled light to reach the camera lens. The reader 10 has an integrated battery with a switching mechanism to energize the appropriate light. Upon scanning of the QR code (or any code), the app interfaces with a cloud-based server which verifies the serial number of the QR code to authenticate the product. The smart phone, in combination with the reader 10 and cloud-based database, illuminates invisible barcodes and serial numbers, and displays them on the phone, returning an image of the label being scanned to display the location of an invisible serial number or other indicia. The smart phone with the reader 10 is then positioned over the location of the invisible indicia to decode and verify the serial number with the matching serial number in the database. Upon verification that the serial number on the label matches the serial number in the database, the smart phone will indicate that the product is genuine by stating "Product Authenticated" or the like. The cloud-based database will record granular data such as the product scanned, date, time and location recorded. Global tracking is provided by the scan, wherein both an inspector scan can be tracked, as well as a consumer scan. The result is a global view of the supply chain, providing a complete picture of inspector and consumer activity, wherein authentic, bogus, and duplicate scans are tracked.

The reader 10 is bluetooth equipped, or any wireless protocol, and will match a smart phone, allowing ease of coupling. The reader 10 can be used with most any type of smart phone, wherein movable brackets can be adjusted to accommodate a particular style of phone. It should be noted that a smart phone can be permanently assigned to the reader 10, or essential formed integral thereto in instances where the reader 10 is used commercially, such as in a port entry or customs office. Having a smart phone permanently assigned to the reader 10, or formed integral thereto, eliminates the need to address software changes that frequent conventional smart phones. Alternatively, the use of conventional smart phones allows the reader 10 to be used on a temporary basis, leaving the smart phone to be used in its conventional manner when not coupled to the reader 10. When a smart phone is formed integral to the reader, the reader essentially has the same functions of a smart phone. Namely, the reader would having microprocessor based computer functions including touch screen interface, and internet access, and include an operating system capable of running downloaded applications.

Figure 9:
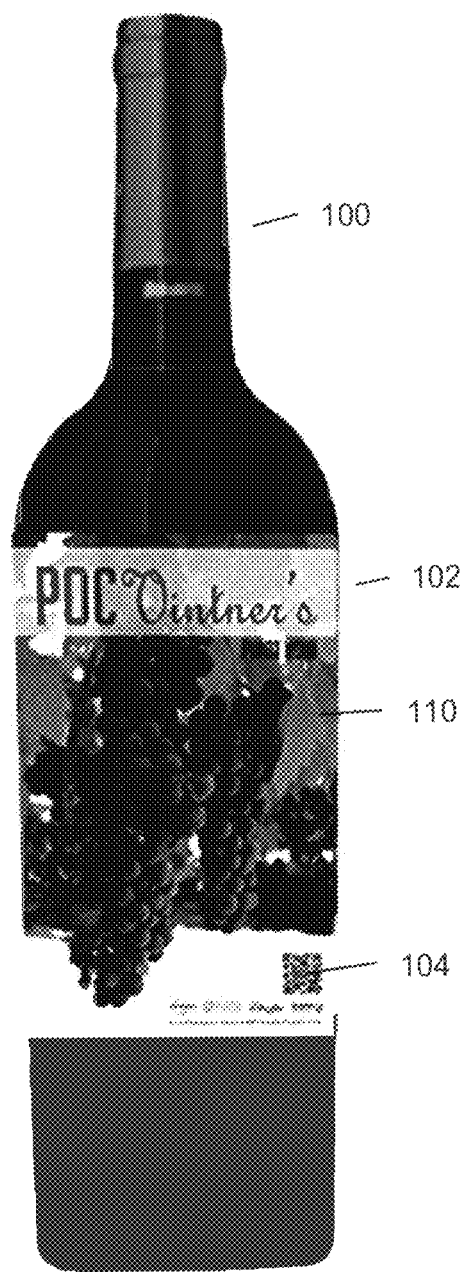
FIG. 9 is a pictorial view of a bottle label depicting an example of a label with a QR code and invisible indicia.
Figure 10:
FIG. 10 is a pictorial view depicting the reading device with smart phone positioned to scan a QR code on the bottle label example.
Figure 11:
FIG. 11 is a pictorial view depicting the reading device with smart phone indicating where hidden indicia is located on the bottle label example.
Figure 12:
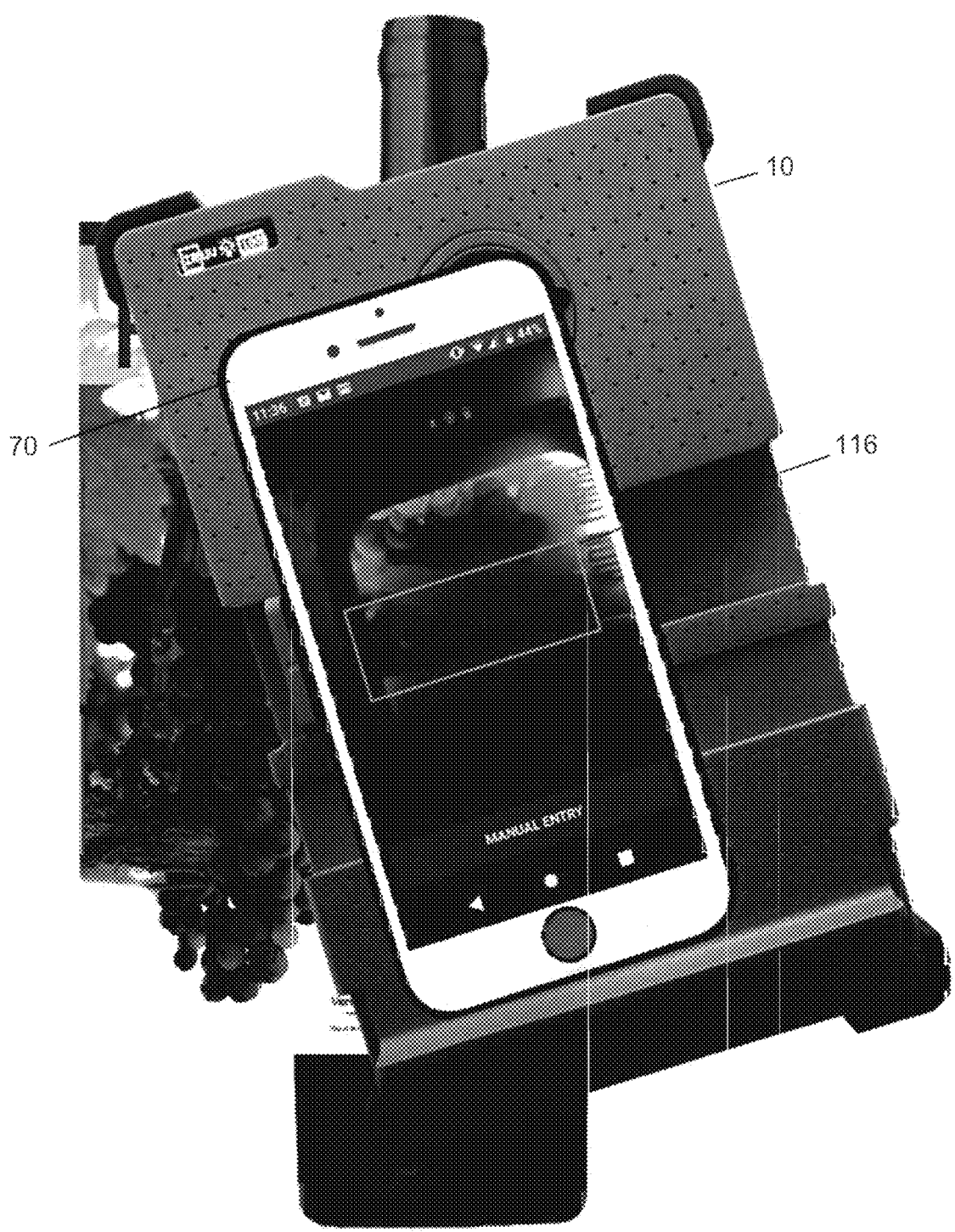
FIG. 12 is a pictorial view depicting the reading device with smart phone positioned to scan the area identified as having hidden indicia of the bottle label example.
Figure 13:
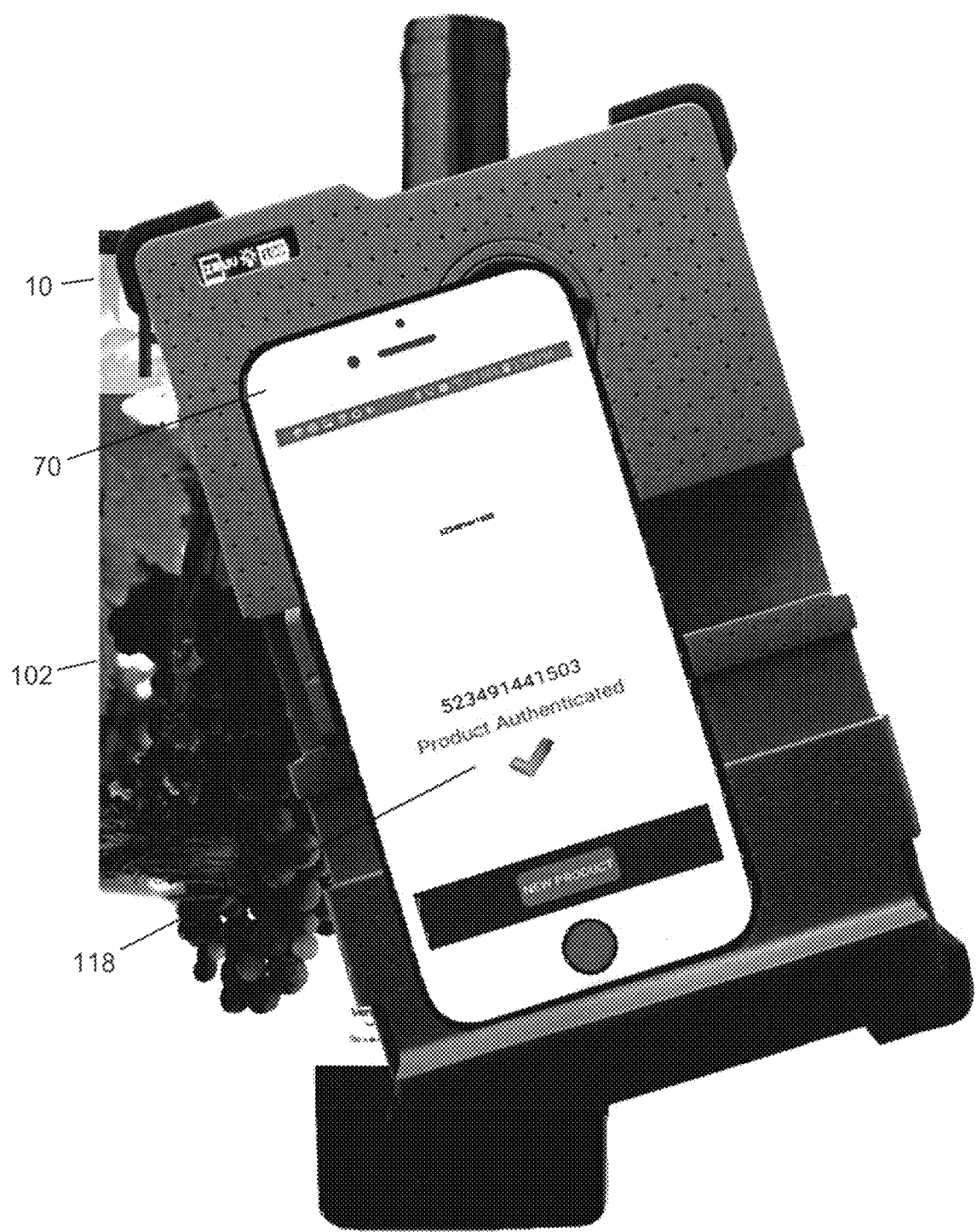
FIG. 13 is a pictorial view depicting the reading device with smart phone communicating that the bottle label example has been authenticated.

FIG. 9 is a pictorial view of a bottle 100 having a label 102 depicting an application example of the invention. The label 102 in this example is equipped with a QR code 104 and hidden/invisible indicia which, in this example, is embedded in a green leaf, the pigment matching the background. FIG. 10 depicts the reader 10 with the smart phone 70 aligned so that the lens spacer 50 is placed over the QR code as illustrated on the display screen 76. The app placed on the smart phone 70 automatically interfaces with a cloud-based database to determine if the scan label is authentic 106. The operator can then request a scan 108 of the invisible indicia which, in this example, is a serial number. As shown in FIG. 11, a reproduction 112 of the label 102 is pictured on the display screen, indicating the location of the hidden indicia 110 using a text message 114. FIG. 12 depicts the reader 10 with the smart phone 70 aligned so that the lens spacer 50 is placed over the location described by the text message 114. The display screen 76 reveals the hidden indicia serial number 116. The app placed on the smart phone 70 again automatically interfaces with the cloud-based database. FIG. 13 is a pictorial depicting the reader 10 with the smart phone 70 displaying that the bottle label hidden indicia has been authenticated 118. The hidden indicia can be dot patterns, character, numbers, bar codes, digital water marks and so forth.

The invention provides a process for authenticating a document comprising the steps of printing hidden indicia on a document with a RainbowSecure® invisible ink; affixing a reader device to a smart phone, said reader having a power supply and a selectable IR or UV light source producing a predetermined wavelength; placing said reader device and said smart phone over a document containing said invisible ink; decoding said invisible ink with said light source to reveal a first image; capturing said first image with said smart phone; communicating said first image to a cloud based database containing authentic images; comparing said first image with said authentic images; and displaying confirmation of the authenticity of said first image on said smart phone. The process further includes the steps of forwarding an photo or text message describing a location of a second image; placing said reader device over said location of said second image; decoding invisible ink over said location with said light source to reveal said second image; capturing said second image with said smart phone; communicating said second image to said cloud based database containing authenticating codes; comparing said second image with said authenticating codes; and receiving confirmation of the authenticity the second image. The process can be used to record when and an image was scanned, as well as where the image was scanned by use of the smart phone gps connection.

The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

All patents mentioned in this specification are indicative of the levels of those skilled in the art to which the invention pertains. One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An authentication device comprising:
   a reader device including an internal battery and at least one movable bracket;
   a lens attached to the reader device, wherein the lens houses a light source;
   a mobile device including a microprocessor coupled to an interface, memory, and an operating system;
   wherein the lens is operable to be attached to a camera;
   wherein the reader device is operable to be attached to the mobile device;
   wherein the reader device is operable to be removed from the mobile device;
   wherein the reader device is operable to communicate with the mobile device;
   wherein the light source is powered by the internal battery;
   wherein the light source is operable to emit light of at least one predetermined wavelength, thereby revealing at least one hidden image;
   wherein the camera is operable to capture the at least one hidden image; and
   wherein the mobile device is operable to authenticate the at least one hidden image based on at least one authentic image.

2. The authentication device according to claim 1, wherein the at least one hidden image includes invisible ink, and wherein the invisible ink includes a wavelength absorptive pigment with a narrow absorptive band.

3. The authentication device according to claim 2, wherein the invisible ink is operable to be printed with a digital printing press.

4. The authentication device according to claim 1, wherein the at least one predetermined wavelength includes infrared (IR) light having a wavelength between 700 nm to 1100 nm and/or ultra-violet (UV) light having a wavelength between 200 nm to 400 nm.

5. The authentication device according to claim 1, wherein the lens includes an anti-reflective coating.

6. The authentication device according to claim 1, wherein the at least one movable bracket includes an adjustable height bracket and an adjustable width bracket, and wherein the at least one movable bracket is operable to maintain a position of the camera relative to the lens.

7. The authentication device according to claim 1 further including a lens spacer attached to the reader device, wherein the lens spacer includes a flexible shroud, and wherein the lens spacer is operable to reduce ambient light.

8. The authentication device according to claim 7, wherein the lens spacer includes a heat sink.

9. The authentication device according to claim 1, wherein the reader device includes a near-field communication (NFC) and/or a radiofrequency identification (RFID) reader.

10. An authentication device comprising:
    a reader device including an adjustable height bracket and an adjustable width bracket;
    a lens attached to the reader device, wherein the lens houses a light source;

a lens spacer attached to the reader device;

a shroud coupled to a distal end of the lens spacer, wherein the shroud is operable to reduce ambient light reaching the lens; and a mobile device including a microprocessor coupled to an interface, memory, and an operating system;

wherein the reader device includes a front surface and a rear surface spaced apart by a continuous sidewall, thereby forming a cavity, and wherein the cavity houses an internal battery;

wherein the lens is operable to be attached to a camera;

wherein the reader device is operable to be attached to the mobile device;

wherein the light source is powered by the internal battery;

wherein the light source is operable to emit light of at least one predetermined wavelength, thereby revealing at least one hidden image;

wherein the camera is operable to capture the at least one hidden image; and wherein the mobile device is operable to authenticate the at least one hidden image based on at least one authentic image.

11. The authentication device according to claim 10, wherein the at least one hidden image includes invisible ink, and wherein the invisible ink includes a wavelength absorptive pigment with a narrow absorptive band.

12. The authentication device according to claim 10, wherein the shroud is operable to conform to curved surfaces.

13. The authentication device according to claim 10, wherein the lens spacer includes a filter lens, and wherein the filter lens includes an anti-reflective coating.

14. The authentication device according to claim 10, wherein the reader device includes a near-field communication (NFC) and/or a radiofrequency identification (RFID) reader.

15. The authentication device according to claim 10, wherein the lens spacer includes a heat sink.

16. A process for authenticating an image on a product or document comprising the steps of:

providing at least one image;

providing a reader device affixed to a mobile device, wherein the reader device includes a lens, wherein the lens is affixed to a camera and includes a light source;

placing the reader device over at least one image;

the light source emitting light of at least one predetermined wavelength, thereby illuminating the at least one image;

the camera capturing the at least one image;

the reader device communicating with the mobile device;

the mobile device communicating with a database, wherein the database contains at least one authentic image;

the at least one image being authenticated based on the at least one authentic image; and the mobile device displaying authentication data of the at least one image.

17. The process of claim 16, wherein the at least one image includes at least one hidden image, and wherein the light source is operable to reveal the at least one hidden image.

18. The process of claim 17, wherein the at least one hidden image includes invisible ink, and wherein the invisible ink is operable to be printed by a digital printing press.

19. The process of claim 16, further comprising the mobile device receiving image data from the database, wherein the image data includes image location data.

20. The process of claim 16, further comprising the mobile device indicating a location of the at least one image.

* * * * *